United States Patent [19]

Lambe

[11] 4,293,017
[45] Oct. 6, 1981

[54] DUAL-CHAMBER PNEUMATIC TIRE

[76] Inventor: Donald M. Lambe, 111 Abbey, Birmingham, Mich. 48008

[21] Appl. No.: 79,315

[22] Filed: Sep. 27, 1979

Related U.S. Application Data

[63] Continuation-in-part of Ser. No. 856,294, Dec. 1, 1977, abandoned.

[51] Int. Cl.³ .......................... B60C 5/06; B60C 17/00
[52] U.S. Cl. .................................... 152/339; 152/349
[58] Field of Search ........................ 152/331, 339–342, 152/343–345, 152, 158, 349–350

[56] References Cited

U.S. PATENT DOCUMENTS

| 2,244,941 | 6/1941 | Degnon | 152/341 |
| 2,525,752 | 10/1950 | Khalil | 152/340 |
| 3,508,596 | 4/1970 | Blair | 152/340 |

FOREIGN PATENT DOCUMENTS

| 2517895 | 11/1976 | Fed. Rep. of Germany | 152/340 |
| 1266629 | 6/1961 | France | 152/341 |
| 34-5751 | 2/1959 | Japan | 152/342 |
| 102361 | 6/1963 | Norway | 152/339 |
| 4025 | of 1898 | United Kingdom | 152/340 |
| 347690 | 4/1931 | United Kingdom | 152/340 |

*Primary Examiner*—John E. Kittle
*Assistant Examiner*—Lois E. Boland
*Attorney, Agent, or Firm*—Hauke and Patalidis

[57] ABSTRACT

A dual-chamber pneumatic tire having two separate concentric annular air chambers. The outermost air chamber, disposed behind the tire tread normally in contact with the ground, is toroidal and substantially elliptical in cross-section, and is inflated at a higher pressure than the innermost chamber disposed in the remaining volume of the tire. The two chambers are separated by a wall or diaphragm which is integrally attached to the tire casing interior walls or which is, alternatively, made removable. The low pressure innermost chamber is inflated by means of a conventional air valve, while the outermost chamber is inflated by means of an additional air valve connected to the wall or diaphragm by means of a flexible hose. The structure of the invention is particularly adapted to tubeless tires.

2 Claims, 12 Drawing Figures

U.S. Patent  Oct. 6, 1981  4,293,017
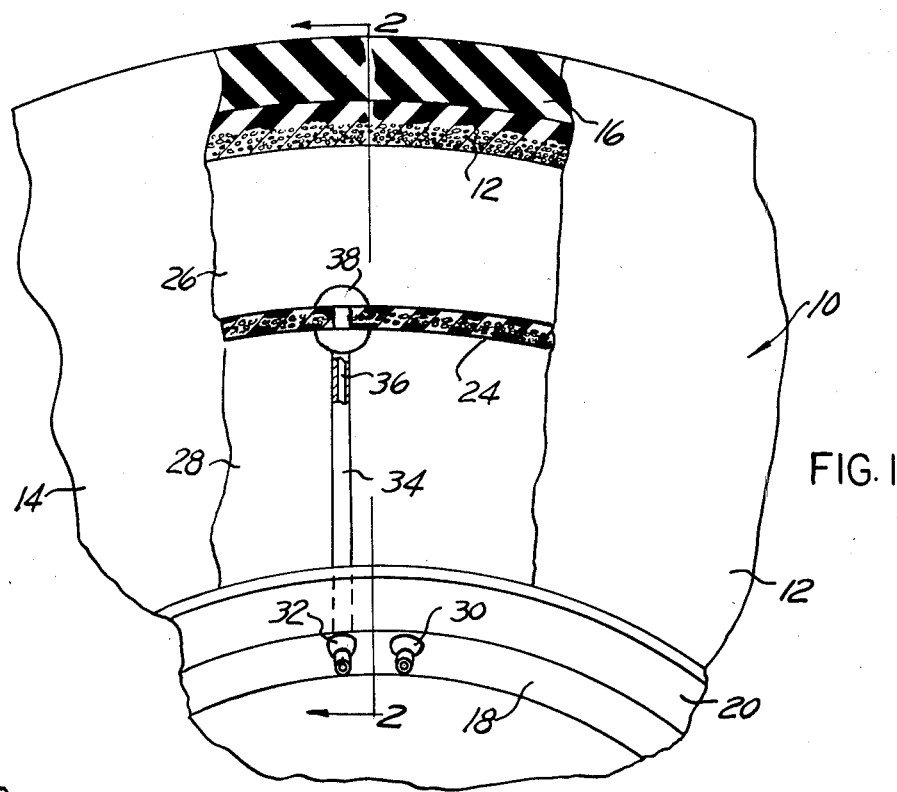
FIG. 1
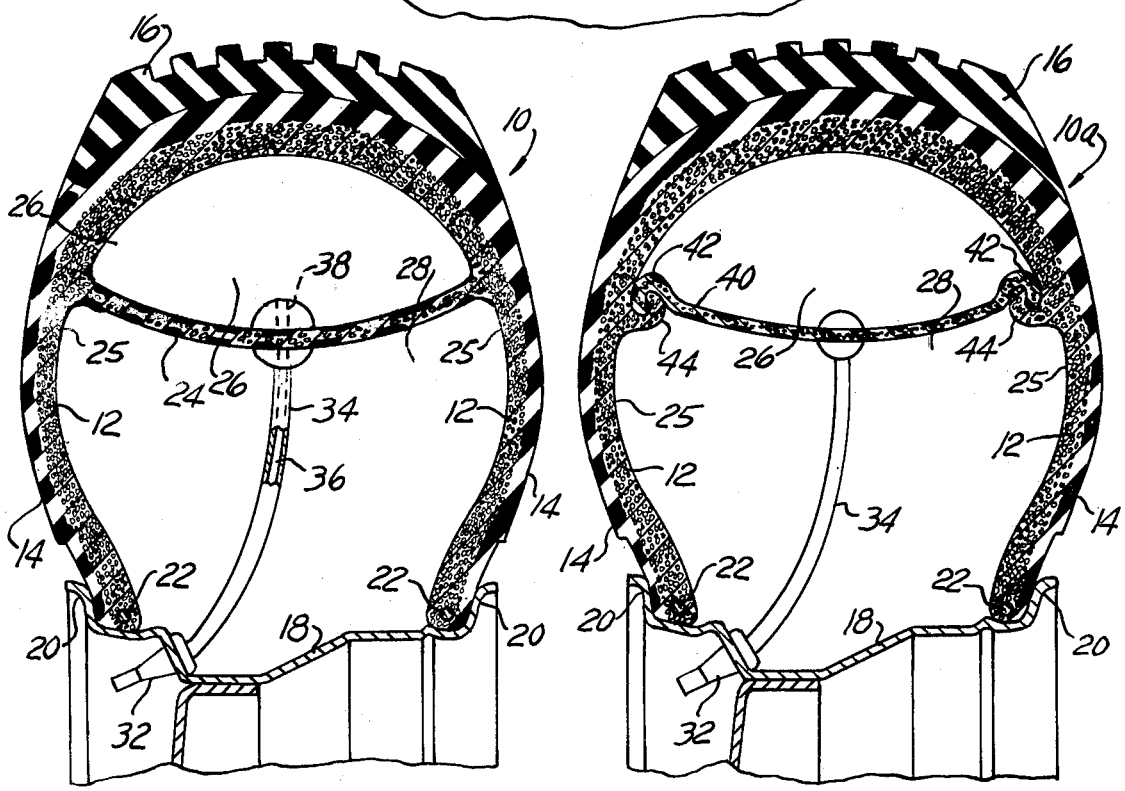
FIG. 2
FIG. 3

DUAL-CHAMBER PNEUMATIC TIRE

CROSS-REFERENCE TO RELATED APPLICATION

The present application is a continuation-in-part of application Ser. No. 856,294 for Dual-Chamber Pneumatic Tire, filed Dec. 1, 1977, now abandoned.

BACKGROUND OF THE INVENTION

Conventional pneumatic tires for wheeled vehicles, such as automobiles and the like, rely on a single air chamber inflated at uniform pressure for absorbing road shocks and bumps. However, shock absorbing is accomplished most effectively with relatively low pressure tires, whereas ease and precision of steering, durability of the tires and fuel economy are more aptly to be achieved with relatively high pressure tires. Therefore, conventional single chamber tires are a compromise between inherently conflicting requirements.

The present invention relates to pneumatic tires for wheeled vehicles, and more particularly to an improved tubeless pneumatic tire provided with a pair of concentric annular air chambers inflated preferably at different air pressures, the pressure in the outermost chamber being higher than the pressure in the innermost chamber.

Attempts have been made in the past to design pneumatic tires with a multiplicity of air chambers, as disclosed for example in U.S. Pat. Nos. 2,196,814, 2,525,752, 2,735,471 and 2,925,845, and in British patent specification No. 347,690 and German Patent Publication No. 2,517,895. Such designs of multi-chamber pneumatic tires are complicated, and therefore require complex and costly molds for manufacturing, resulting in heavy structures using a large volume of solid rubber material or casing material as compared to the volume of air contained in the air chambers, with the resulting inconvenience of high cost of raw materials, lack of flexibility of the pneumatic tire, heavy masses in rotation, and substantial constant friction and deformation of elastomeric material causing considerable heating.

Other designs have been proposed for pneumatic tires such as disclosed in U.S Pat. Nos. 2,780,266, 2,508,596, 2,560,609 and 2,680,463, and in the aforementioned German Patent Publication, for example, which are, for all practical purposes, directed to concentrically mounting a pair of pneumatic tires, one within the other, with the added complication of rendering such compound pneumatic tires incapable of being mounted on conventional wheel rims.

Further efforts in designing multi-chamber pneumatic tires are represented by structures such as disclosed in U.S. Pat. No. 1,989,402 wherein a pneumatic tire having much analogy with a conventional tire is provided with an auxiliary thread mounted thereon by rivets, or other fasteners, such auxiliary thread being provided with a built-in air chamber, and in U.S. Pat. No. 2,850,069 teaching a multi-chamber inner tube for pneumatic tires requiring special rims or special retaining flaps mounted within the inner tube.

SUMMARY OF THE INVENTION

The present invention remedies the inconveniences and shortcomings of the prior art by providing a simple structure, more particularly for tubeless pneumatic tires, which requires no special rim construction or adapters, which can readily be mounted on a conventional wheel rim in the stead of a conventional tubeless tire, which greatly increases fuel mileage by reducing drag and friction, without reducing the riding comfort or the overall shock-absorbing quality of the tire, and which greatly increases road stability at high speed and steerability of a motor vehicle as compared to conventional tires. Such results are accomplished by the present invention by forming a concentric separate toroidal peripheral air chamber in a pneumatic tire otherwise of conventional structure, such separate toroidal peripheral air chamber being substantially elliptical in cross-section and normally inflated with air at a pressure higher than the separate chamber concentrically disposed within the casing between the peripheral chamber and the wheel rim. The two air chambers are separated by a flexible wall or diaphragm which is permanently formed in the interior of the pneumatic tire casing or, alternatively, which is removable. Because the outermost, or peripheral, air chamber is inflated at a relatively high pressure, there results a considerable reduction of the flexing of the tire tread and of the tire sidewalls proximate to the tread, and thus a considerable reduction of the ground drag and friction, and of loss of energy due to the deformation and flexion of the tread and sidewalls, as compared to conventional tires. The amount of energy required for propelling the vehicle at a given velocity is consequently considerably reduced, which in turn causes a sizable reduction in fuel consumption of vehicles propelled by internal combustion engines. However, because the inner chamber of the pneumatic tire of the invention is inflated at a relatively low air pressure, the shock absorbing capabilities and riding comfort of a tire according to the invention are comparable to that of a conventional pneumatic tire or even enhanced relative to a conventional pneumatic tire. In addition, in view of the dual air chamber structure of a pneumatic tire according to the invention, safety is greatly enhanced as a blow-out will generally be limited to one of the air chambers, most likely the outer high pressure chamber, and the tire will remain partially inflated and capable of continuing its function, even though it may be desired to slightly reduce the speed of travel of the vehicle after a puncture has caused air to be exhausted from one of the chambers.

The many advantages and objects of the present invention will become apparent to one skilled in the art when the following description of the best modes contemplated for practicing the invention is read in conjunction with the accompanying drawing, wherein like numerals refer to like or equivalent parts, and in which:

BRIEF DESCRIPTION OF THE DRAWING

FIG. 1 is a partial side elevational view of a pneumatic tire according to the present invention mounted on a conventional wheel rim, and illustrated with a portion broken away to show the internal construction;

FIG. 2 is a transverse section thereof along line 2—2 of FIG. 1;

FIG. 3 is a view similar to FIG. 2 but showing a modification of structure;

DETAILED DESCRIPTION OF THE PREFERRED EMBODIMENTS

Figure 4:
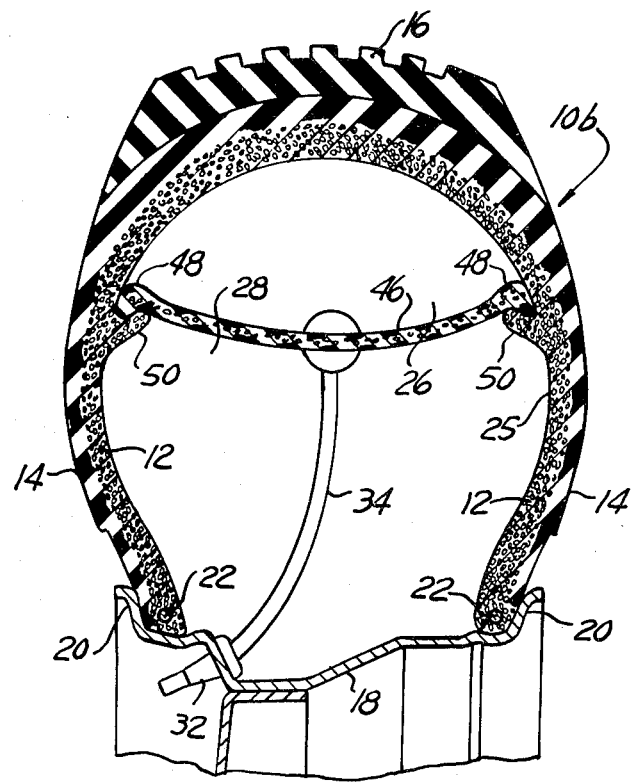
FIG. 4 is a view similar to FIG. 3 but showing a further modification thereof.

Referring to the drawings, and more particularly to FIGS. 1 and 2 thereof, there is illustrated an example of structure for pneumatic tire 10 according to an aspect of the present invention. The pneumatic tire 10 is provided with a casing 12 made in the usual manner of several cord plys of synthetic fiber, glass, or metallic threads, impregnated and coated with vulcanized rubber and provided on its exterior with a coating of rubber forming sidewalls 14. A tread 16, in the form of a layer of rubber, is disposed on the outside circumference of the tire and forms a bearing surface partially in engagement with the ground, not shown, during normal use. The tire 10 is mounted on a conventional wheel rim 18 provided with flanges 20 engaging and holding the tire at the two lateral parallel bead portions 22 of the casing 12.

The improvement of the invention consists in providing the tire 10 with a relatively flexible annular wall or diaphragm 24 integrally formed of the tire material, including the cord plys if so desired, and extending from wall 25 to wall 25 in the interior of the tire casing 12. The diaphragm 24 thus defines two concentric air chambers, namely a peripheral or outer generally toroidal annular air chamber 26 which is substantially elliptical in cross-section, and an annular central or inner chamber 28 between the main portions of the sidewalls 25 and the wheel rim 18.

The tire 10 of FIGS. 1-2 is of tubeless construction, that is the tire 10 does not require an inner tube and is held on the rim 18 by the air pressure in the inner chamber 28 urging the sidewalls 14 apart from each other and applying the exterior of the bead portions 22 of the tire firmly against the inner surface of the rim flanges 20. Pressurized air is introduced in the inner chamber 28 in the usual manner by means of a conventional tubeless tire air valve 30 disposed through an appropriate valve aperture through the rim 18. Pressurized air is introduced into the outer chamber 26 by means of a second valve 32, also disposed through an aperture in the rim 18, either proximate to the conventional valve 30, as illustrated, or angularly away from it, at some other location around the rim 18. The valve 32 is connected by means of a tubular flexible hose 34 having an internal passageway 36 to an inlet aperture 38 formed through the wall or diaphragm 24 for admitting pressurized air into the outer chamber 26 for inflation.

The annular peripheral outer toroidal chamber 26 is normally inflated at a relatively high air pressure, while the inner chamber 28 is normally inflated at a relatively low pressure. In this manner, the area of the tire tread 16 in contact with the roadway surface is substantially reduced, during normal driving conditions, as compared to the tread area normally in contact with the roadway surface in conventional low pressure cushion tires. Drag, friction, wear, flexion and distortion of the tire, and heating of the tire, are considerably reduced as compared to conventional tires. All of those advantages add up for providing increased fuel mileage and considerable reduction in tire wear.

FIG. 3 illustrates a modified structure for a pneumatic tire 10a according to the present invention, in which the partition wall or diaphragm separating the outer or peripheral chamber 26 from the inner chamber 28 is in the form of a removable relatively flexible diaphragm 40 provided at each of its lateral complementary edges with a flanged curvilinear portion 42 interlocking with a corresponding curvilinear annular ridge or bead 44 formed integral with the internal wall 25 of the tire casing 12. Such a structure, provided with a removable wall or diaphragm 40, simplifies the manufacture of the tire, as compared to the structure of FIGS. 1-2, and permits to gain access to the interior of the outer or peripheral chamber 26 for repairing a puncture when it is desirable to repair such puncture from the inside of the casing. It will, however, be appreciated that punctures in tubeless tires may generally be repaired by means of hot patches applied to the inside of the tire casing over the puncture, and that the structure of FIG. 3 permits to easily effectuate such repair after removing the diaphragm 40 by unhooking its flanged edges 42 from the tire internal wall ridges or beads 44.

Referring now to FIG. 4, there is illustrated a modification of the invention in the form of a pneumatic tire 10b provided with two internal chambers, an outer peripheral toroidal chamber 26, substantially elliptical in cross-section, and an inner chamber 28 separated by a removable wall diaphragm 46, having substantially the same configuration as that of the diaphragm 40 of FIG. 3, but provided on each of its lateral edges with a flange 48 in the form of a bead engaged with a conforming complementary internal wall ridge or bead 50 integrally formed on the interior wall 25 of the tire casing 12. As the air pressure in the outer or peripheral chamber 26 is greater than the air pressure in the inner chamber 28, the pressure differential between the two chambers urges the diaphragm 46 in the direction that firmly engages the diaphragm lateral edge beads 48 in contact with the tire internal wall beads 50, such as to provide an effective seal between the two air chambers 26 and 28. The structure of FIG. 4 is as effective as the structure of FIG. 3, as long as the air pressure in the peripheral chamber 26 is slightly higher than the pressure in the inner chamber 28, but the structure of FIG. 4 is easier to mold and unmold, therefore lower in manufacturing costs.

Figure 5:
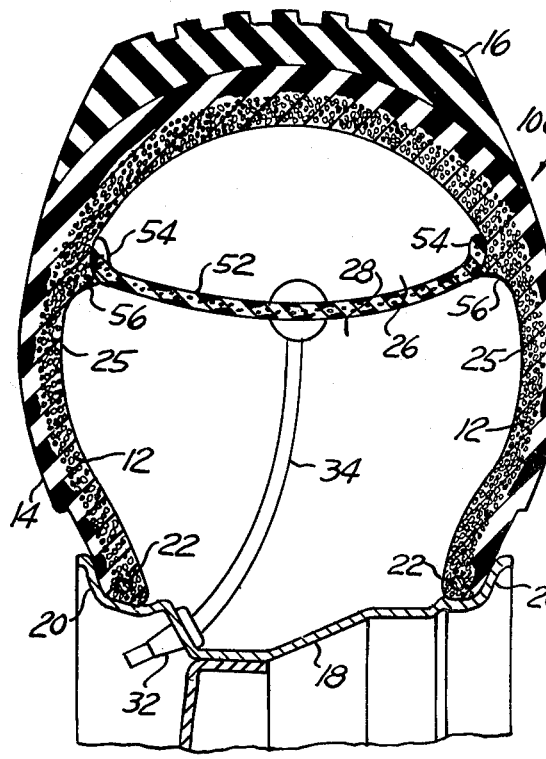
FIG. 5 is a view similar to FIG. 4 but showing another modification thereof.

FIG. 5 illustrates a further modification of a diaphragm structure, wherein the diaphragm 52 separating the outer or peripheral chamber 26, substantially elliptical in cross-section, from a inner chamber 28 of the tire 10c is provided with an outwardly turned flange 54, on each edge, engaged with the surface of a simple V-shaped ridge or bead 56 formed integrally on the internal wall 25 of the tire casing 12. As the air pressure in the outer peripheral chamber 26 is higher than the air pressure in the inner chamber 28, the pressure differential tends to apply the outwardly turned flanges 54 of the diaphragm 52 firmly against the surface of the internal side wall beads 56 engaged therewith, substantially as the pressure differential between the inside of the tubeless pneumatic tire firmly presses the outer surface of the tire sidewalls proximate the tire beads engaged with the rim flanges against the inner surface of the rim and of the rim flanges, thus effecting a leakproof seal preventing the air under pressure within the casing of the tire from escaping to the atmosphere. The arrangement of FIG. 5 requires inflating the outer peripheral chamber 26 prior to inflating the inner chamber 28, such as to firmly apply the diaphragm edge flanges 54 firmly against the surface of the internal wall beads 56, to prevent leakage of air from the peripheral chamber 26 to the inner chamber 28, prior to inflating the inner chamber 28. For proper operation of the tire 10c, the pressure within the outer chamber 26 must be constantly maintained higher than the pressure within the inner chamber 28, such as to prevent the diaphragm 52 from being dislodged from its position. Such precautions are not required with the structure of FIG. 4, wherein the diaphragm flange beads 48 are provided with a certain amount of interlocking with the internal wall beads 50, or in the structure of FIG. 3 wherein the outer chamber 26, if so desired, could be inflated at a much higher pressure than the inner chamber 28, without causing dislodgement of the diaphragm 40 in view of the strong anchoring of the diaphragm provided by the diaphragm edge flanges 42 interlocking firmly with the curvilinear internal wall ridges or beads 44.

Figure 6:
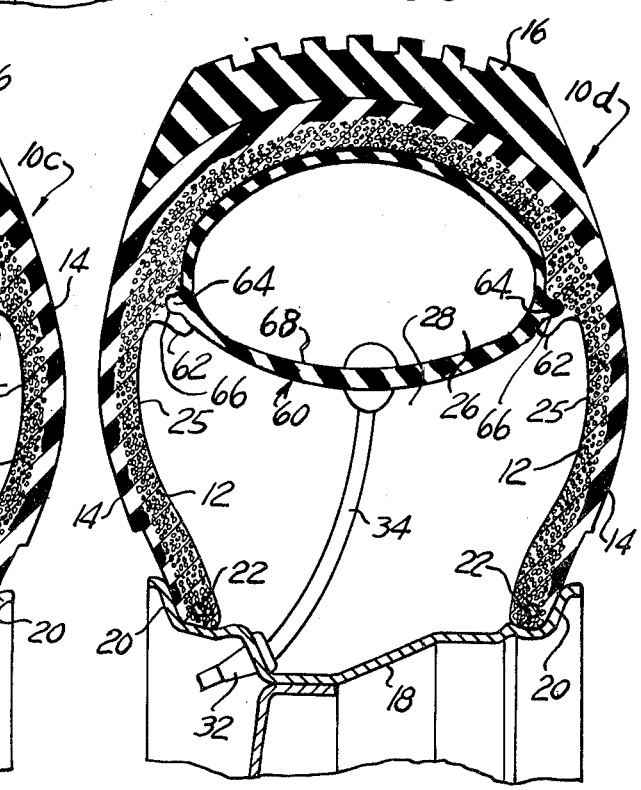
FIG. 6 is a view similar to FIG. 5 but showing another modification thereof.

As illustrated at FIG. 6, a pneumatic tire 10d according to the present invention may be provided with a peripheral or outer annular chamber 26 in the form of a toroidal inner tube 60 having a transverse substantially elliptical sectional area such that, when inflated, it is held in position in the periphery of the internal surface of the tire casing 12 by a pair of projecting annular ridges 62 integrally formed on the internal wall 25 of the tire casing 12. The interior of the tire 10d is thus provided with two concentric annular air chambers, the outer toroidal chamber 26 formed within the inner tube 60 and the inner chamber 28 formed between the lateral walls 25 of the casing 12 and the wheel rim 18. The inner tube 60 is inflated by means of a valve 32 connected to the inner tube by means of a flexible pipe or hose, 34, as previously described, while the tire inner chamber 28 is inflated, also as previously described, by means of a conventional tubeless tire valve, not shown at FIG. 6.

It is readily apparent that the diaphragms 24 of FIGS. 1 and 2, 40 of FIG. 3, 46 of FIG. 4 and 52 of FIG. 5, are relatively resilient and elastically deformable and are slightly bulging toward the inner chamber 28, such that the outer chamber 26, although inflated at a higher pressure than the inner chamber 28, provides a very effective means for absorbing shocks and bumps. It is also apparent that the diaphragm, whatever its structure, has its lateral edges engaged with the interior sides 25 of the sidewalls 14 relatively proximate the tread 16. It will be appreciated that the inner tube 60 of FIG. 6 accomplishes the same results and may be provided, if so desired, with interlocking anchoring means in the form of a pair of parallel ridges 64, similar to the ridges 42 of FIG. 3, or 48 of FIG. 4, at the areas where engaged with the tire internal ridges 62, the ridges 62 having each an appropriate complementary groove 66 accepting the inner tube corresponding interlocking ridge 64. Also, the inner tube 60 may be provided with a reinforced thicker wall 68 at its portion separating the inner chamber from the outer chamber.

It will be readily apparent to those skilled in the art that motor vehicle pneumatic tires according to the present invention, permitting to inflate the outer toroidal peripheral chamber 26, substantially elliptical in cross-section, at a higher air pressure than the inner chamber 28, provides a high pressure chamber behind the tire tread portion in direct contact with the ground, resulting in optimum fuel economy by reducing the area in engagement with the ground and consequently the ground caused drag, thus increasing durability and ease of steering. The separate low pressure inner chamber 28 provides good riding qualities as a result of efficient shock absorption. The pressure in each chamber may be independently varied at will, such as to optimize riding qualities and fuel economy under a wide variety of road conditions, vehicle loads and balance, and average driving speed and habits.

Figure 7:
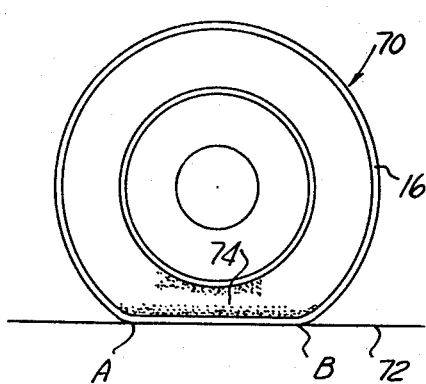
FIG. 7 is a schematic side elevation view of a normally loaded low pressure conventional tire.
Figure 9:
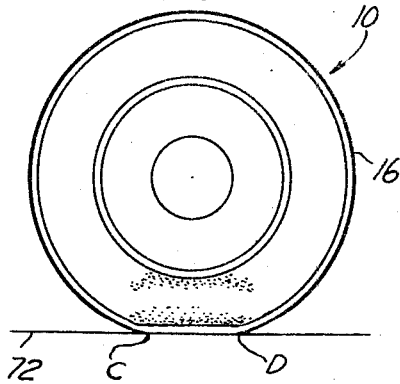
FIG. 9 is a schematic side elevation of a normally loaded tire according to the structure of the present invention.
Figure 8:
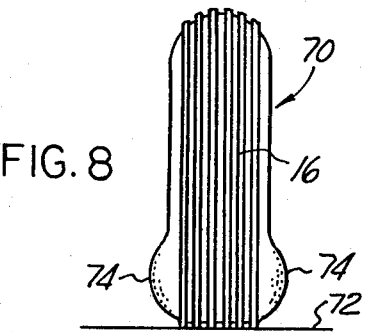
FIG. 8 is a schematic front elevation view thereof.

FIGS. 7-8 illustrate schematically a conventional low pressure elliptical pneumatic tire 70 under normal load. For example, with a vehicle gross weight of 3,000 lbs., and assuming that the vehicle weight is evenly distributed, each tire supports 750 lbs. With a normal air pressure of 25 psi in each tire 70, 30 in.$^2$ of tire tread surface 16 are engaged with the ground 72, causing considerable deflection and out-bulging of the tire sidewalls, as shown at 74 at FIG. 8. A substantial length of the periphery of the tire, as represented by line AB at FIG. 7, is engaged with the ground 72. By contrast, in a pneumatic tire 10 according to the present invention, FIGS. 9-10, if the pressure in the outer chamber of the tire 10 is increased to 50 psi, and the pressure in the inner chamber is maintained at 25 psi, only approximately 15 in.$^2$ of each tire peripheral tread 16 are engaged in contact with the ground 72, as represented by the much shorter line CD, thus resulting in much less tire deformation and deflection, and greatly reducing drag, fuel consumption, heat build-up and tire wear. In addition, the smaller tread area in contact with the ground greatly decreases steering efforts, permitting to design motor vehicle steering mechanisms with more responsive ratios and providing additional cost savings and fuel economy by eliminating the need for power steering in most passenger vehicles.

Figure 10:
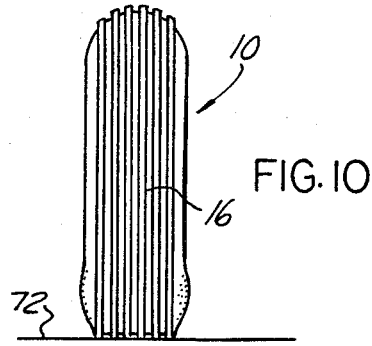
FIG. 10 is a schematic front elevation view thereof.
Figure 11:
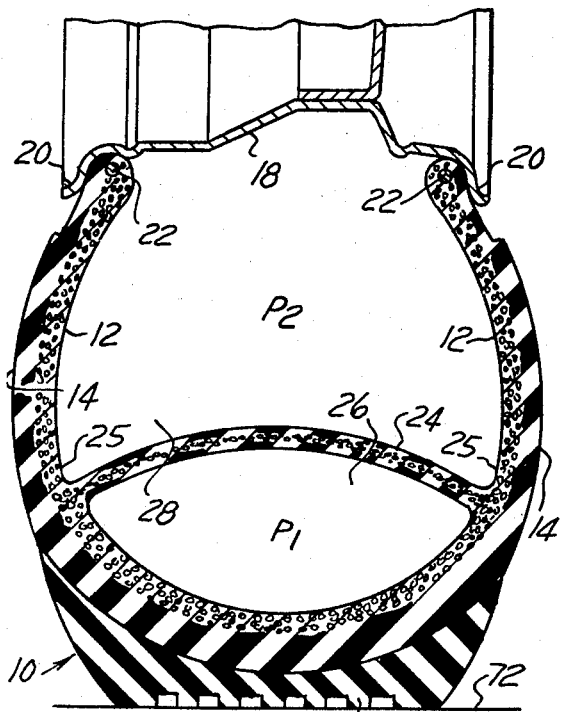
FIG. 11 is a view similar to FIG. 2 but showing the tire structure of FIG. 2 under normal load causing normal deflection of the tire sidewalls.
Figure 12:
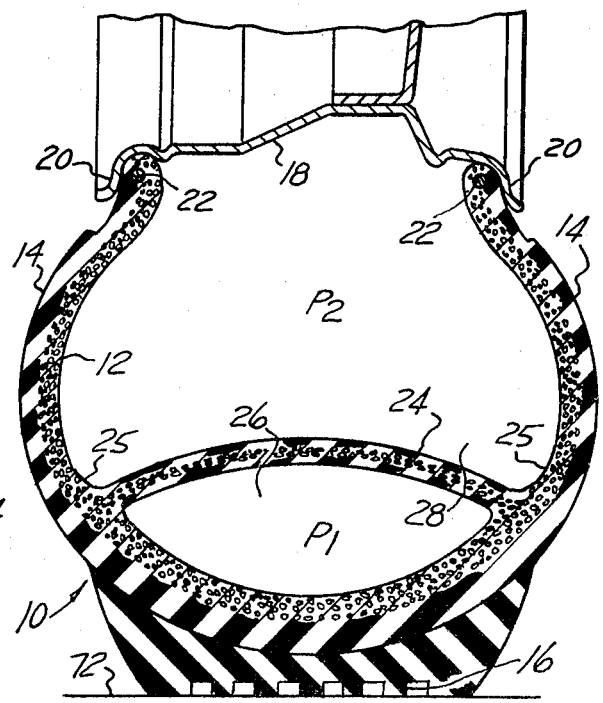
FIG. 12 is a view similar to FIG. 11 and showing the tire overloaded or under the influence of an extreme road shock or bump.

FIG. 11 illustrates a section through a tire according to the present invention, as for example the tire 10 of FIGS. 1-2, under normal load and road conditions. Because the pressure P1 in the outer toroidal chamber 26 is greater than the pressure P2 in the inner chamber 28, and although a relatively small tire tread area is needed to support the weight of the vehicle, a correspondingly larger surface area and wider inner air chamber are needed to support the same weight. The larger surface area is provided by the annular internal wall or diaphragm 24 having a width substantially larger than the width of the tread 16, the diaphragm 24 further bulging and being bowed towards the inner chamber 28. When the tire 10 becomes momentarily overloaded, as shown at FIG. 10, as a result of a road shock or bump, shock absorption occurs through deformation of the surface of the tire tread 16, compression of the elastic material of the tread 16 and of the subjacent casing 12, compression of the outer chamber 26, and the resulting flexing and elastic deformation of the diaphragm 24. Deflection and elastic deformation of the diaphragm 24 is completely unobstructed by the tread and the tire sidewalls 14. The shocks and bumps are smoothly and radially absorbed through compression of the inner chamber 28, causing the tire sidewalls 14 to bulge outwardly, as shown. Because the diaphragm 24 is bowed toward the inner chamber 28, and because the diaphragm 24 is substantially flexible and elastic, the out-bowing of the sidewall 14 is unimpeded. The bowing action of the curved sidewall 14, combined with the relatively low air pressure P2 in the relatively high volume inner chamber 28 provides an efficient cushioning effect, and results in smooth riding qualities of the tire in spite of the relatively high air pressure P1 in the outer chamber 26.

In other words, a pneumatic tire according to any of the structures of the present invention presents all the advantages of high pressure tires and low pressure tires combined in one tire. Conventional tires, especially of the elliptical type, when underinflated or even when inflated at recommended pressures, cause considerable drag and heating of the tire, poor fuel consumption, and hard steering. Conventional tires, when overinflated, or even when inflated at recommended pressures, have relatively poor bump and shock absorbing qualities, because under such conditions their relatively straight sidewalls are more rigid and therefore tend to conduct shocks rather than bowing out and effectively absorbing shocks.

Having thus described the present invention by way of examples of structural embodiments, modifications whereof will be apparent to those skilled in the art, what is claimed as new is as follows:

I claim:

1. A dual-chamber tubeless pneumatic tire consisting of a single casing mounted on a conventional wheel rim, said casing comprising a tread portion forming a rolling surface for engagement with the ground, relatively flexible sidewalls integrally attached at edges of said tread portion, a peripheral substantially toroidal outer chamber in said casing disposed internally proximate the rolling surface of said casing, said toroidal outer chamber being substantially elliptical in cross-section, an annular inner air chamber in said casing disposed concentrically to said outer toroidal chamber, an annular elastically deformable resilient partition wall extending internally from one sidewall to the other sidewall of said casing and separating said outer air chamber from said inner air chamber, said partition wall having a width substantially larger than the width of said tread portion and being elastically bowed toward said inner air chamber, and means for separately inflating said outer air chamber and said inner air chamber at different pressures whereby the pressure in said outer chamber is greater than the pressure in said inner chamber, said inflating means comprising a first air valve disposed through said rim in direct communication with said inner air chamber and a second air valve disposed through said rim placed in communication with said outer air chamber by a flexible conduit disposed through said inner air chamber and connected to an orifice through said partition wall, wherein said outer chamber is formed by a toroidal inner tube peripherally disposed in said casing and held in position by a pair of symmetrically disposed projecting annular beads on the internal surface of the sidewalls of said casing and said inner tube has a pair of lateral projecting annular beads engaged each in a corresponding annular groove in the surface of said beads on the internal surface of the sidewalls of said casing.

2. The dual-chamber pneumatic tire of claim 1, wherein said inner tube has a wall portion of increased thickness disposed toward said inner air chamber.

* * * * *